(12) United States Patent
Croci

(10) Patent No.: US 9,206,915 B2
(45) Date of Patent: Dec. 8, 2015

(54) GREASE VALVE FOR PRESSURE DEVICES

(75) Inventor: Stefano Croci, Erba (IT)

(73) Assignee: TECHNE S.R.L., Erba (Como) (IT)

(*) Notice: Subject to any disclaimer, the term of this patent is extended or adjusted under 35 U.S.C. 154(b) by 892 days.

(21) Appl. No.: 13/361,177

(22) Filed: Jan. 30, 2012

(65) Prior Publication Data

US 2012/0193563 A1 Aug. 2, 2012

(30) Foreign Application Priority Data

Jan. 31, 2011 (IT) .............................. MI2011A0116

(51) Int. Cl.
*F16K 31/44* (2006.01)
*F16K 15/18* (2006.01)
*F16K 5/06* (2006.01)
*F16K 15/04* (2006.01)

(52) U.S. Cl.
CPC ................. *F16K 15/188* (2013.01); *F16K 5/06* (2013.01); *F16K 15/042* (2013.01)

(58) Field of Classification Search
CPC ..... F16K 1/304; F16K 15/042; F16K 15/188; F16K 5/06
USPC .................................................... 137/625.21
See application file for complete search history.

(56) References Cited

U.S. PATENT DOCUMENTS

| 1,872,211 | A  | * | 8/1932 | Yarnall ..................... 137/246.16 |
| 6,669,171 | B1 | * | 12/2003 | Stunkard .................. 251/315.08 |
| 2007/0023725 | A1 |  | 2/2007 | Sepulveda et al. | |

FOREIGN PATENT DOCUMENTS

WO  WO02101479  12/2002

* cited by examiner

*Primary Examiner* — John K Fristoe, Jr.
*Assistant Examiner* — Kevin Barss
(74) *Attorney, Agent, or Firm* — Abelman, Frayne & Schwab

(57) ABSTRACT

An improved greasing valve (10, 10') for pressure devices especially suitable for being applied on plants for applications on pressure devices/plants/containers such as valves, pumps, conduits, compressors, turbines, boilers, tanks and the like, containing liquid or gas with the function of preventing leaks of liquid or gas and allowing pressure control in the plant in case of maintenance work and prior to removing components, the valve comprising devices for cutting off the fluid or gas, lubrication devices and control devices, with said axial and ball/pin sealing devices integrated and/or assembled to a body (12, 12') of the same safety valve.

7 Claims, 3 Drawing Sheets

GREASE VALVE FOR PRESSURE DEVICES

CROSS REFERENCE TO RELATED APPLICATION

The subject application claims the priority of Italian Application MI 2011A000116, filed Jan. 31, 2011, which is incorporated herein by reference.

The present invention relates to an improved grease valve for pressure devices.

More in particular, the present invention relates to a grease valve with axial seal integrated to a ball or pin valve, especially suitable for being applied on devices/plants and/or containers containing pressure fluid (liquid or gas) such as valves, pumps, conduits, compressors, turbines, boilers, tanks, etc., with the function of ensuring the introduction of lubricating/detergent products into the plant while preventing a leak of liquid or gas from a plant or a tank in the event of malfunctioning, failure or similar unfortunate accidents.

Said valves also have the function of allowing the check of any pressure in the plant or tank or in a pump in the event of maintenance work and prior to removing components.

In the event of periodical maintenance work or inspection or in the event of replacement of worn and/or damaged components, it is necessary to check the presence of pressure in the plant prior to removing the components, so as to prevent problems of undesired leaks of liquids or gases that are potentially hazardous for both the users and the environment.

Traditionally, in addition to a greaser, the plants are provided with an axial check valve inserted in the shim of the container or similar device used for the applications with liquids or gases under pressure.

Said greaser is applied to the container or device with the function of allowing the feeding of lubricant into the container or pump or into similar plants and devices for managing oils and gases; the introduction of lubricants is made necessary by the fact that such devices generate considerable friction forces, heat and thermal expansions/shrinkage that are potentially harmful for internal components of devices or similar equipment under pressure. The periodical introduction of lubricant allows ensuring a suitable operation of such components along with the useful life thereof.

In some cases, the interposition of a further cut-off valve (ball, pin, etc.) is required between the check valve and the greaser, connected to a pressure container/device and to the greaser, by means of unions and similar intermediate components.

Once set to sealing condition, such cut-off valve allows enabling the operation on the greaser preventing any system pressure from acting onto the same.

Such embodiment condition, carried out using the traditional components on the market, implies considerable weight and overall dimensions, which is particularly disadvantageous if the devices whereto said safety apparatus is applied have small dimensions.

Moreover, any accessories, actually cumbersome, applied to a plant potentially implies considerable drawbacks in the management of the "lay-out" of the entire structure, especially with reference to applications wherein the small spaces available require the minimisation of any volume; this happens especially in the case of plants such as platforms, well heads, refineries, etc.

The object of the present invention is to obviate the drawbacks discussed hereinabove.

More in particular, the object of the present invention is to provide an improved grease valve for pressure devices which should be easy and simple to remove in the case of maintenance and/or fixing works.

A further object of the present invention is to provide a valve suitable for ensuring a safe seal according to the current regulations for the emission to the environment.

A further object of the present invention is to provide a grease valve having limited weight and overall dimensions so as to reduce the consequent manufacturing costs.

A further object of the present invention is to provide a grease valve suitable for ensuring a high level of resistance and reliability over time.

These and other objects are achieved by the improved grease valve for pressure devices of the present invention comprising devices for cutting off the fluid or gas, lubrication devices and control devices, with said axial and ball/pin sealing devices integrated and/or assembled to a body of the same safety valve.

The construction and functional features of the improved grease valve for pressure devices of the present invention shall be better understood from the following detailed description, wherein reference is made to the annexed drawing tables showing a preferred and non-limiting embodiment thereof, wherein:

FIG. 1 schematically shows a longitudinal cutaway view of the improved grease valve for pressure devices of the present invention;

FIG. 2 shows a schematic and cutaway view of an assembly fitted with grease valve with greaser mounted on a tank or other pressure device;

FIG. 3 schematically shows a longitudinal cutaway view of the grease valve and shutter assembly according to an alternative embodiment;

Figure 1:
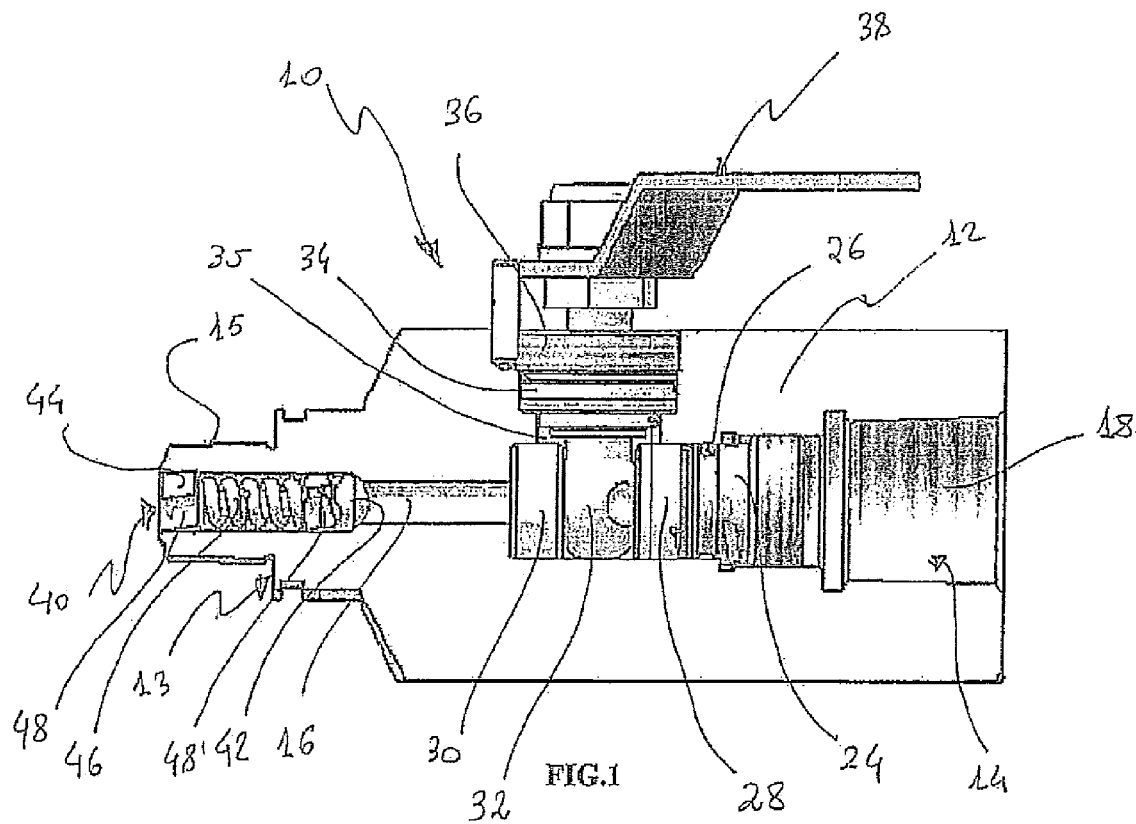

With reference to said figures, the improved grease valve for pressure devices of the present invention, globally indicated with reference numeral 10, exhibits a body 12 with basically cylindrical section with diameter that is constant by a portion that narrows towards an end for defining a portion 13 with partially threaded outer side profile 15 suitable for stabilising the valve relative to a tank 17 or another pressure device.

Body 12 comprises a conduit 14 with profiled seat, arranged on the opposite side relative to the end portion 13 and a coaxial space 16 with diameter is basically smaller than that of conduit 14.

Conduit 14 exhibits a threaded seat 18 placed at one of the ends of body 12 of valve 10 and adapted to allow the stabilisation of a greaser 22.

A dowel 24 is arranged within conduit 14 for adjusting the preload to be attributed to at least a first seat 28 and to at least a second seat 30 according to the pressures involved, at least one seal or O-Ring 26 for the seal of said dowel and one shutter 32 element interposed between said seats.

A seat 35 is formed on body 12 and in radial direction, communicating with conduit 14, suitable for seating a gland 34 and at least one seal 36.

A stem, integral with the shutter 32 element, coaxial with the gland and the at least one seal 36, connects shutter 32 to a lever actuator 38 so as to allow the manual cut off of the lubricant flow.

The assembly consisting of the components described above defines a cut off valve.

Within the coaxial space 16, body 12 seats a control valve 40 comprising a sliding shutter 42, a stopping dowel 44 and an elastic element preferably defined by a helical spring 46 arranged between said sliding shutter 42 and stopping dowel 44. Along the outer side surface, the stopping dowel 44 and the sliding shutter 42 exhibit helical peripheral grooves 48 and 48' suitable for allowing an optimal passage of the lubricant coming from shutter 22.

The stopping dowel 44 and the sliding shutter 42, along with the coaxial space 16 define a guide and a support for the helical spring 46 that acts as antagonist element suitable for keeping the sliding shutter for closing the coaxial space 16 on the side in communication with conduit 14.

Integrated within body 12 and arranged in radial direction at the shutter 32 element, valve 10 comprises an optional venting valve 50 and an optional discharge channel 52 made in the same body of the valve.

Figure 2:
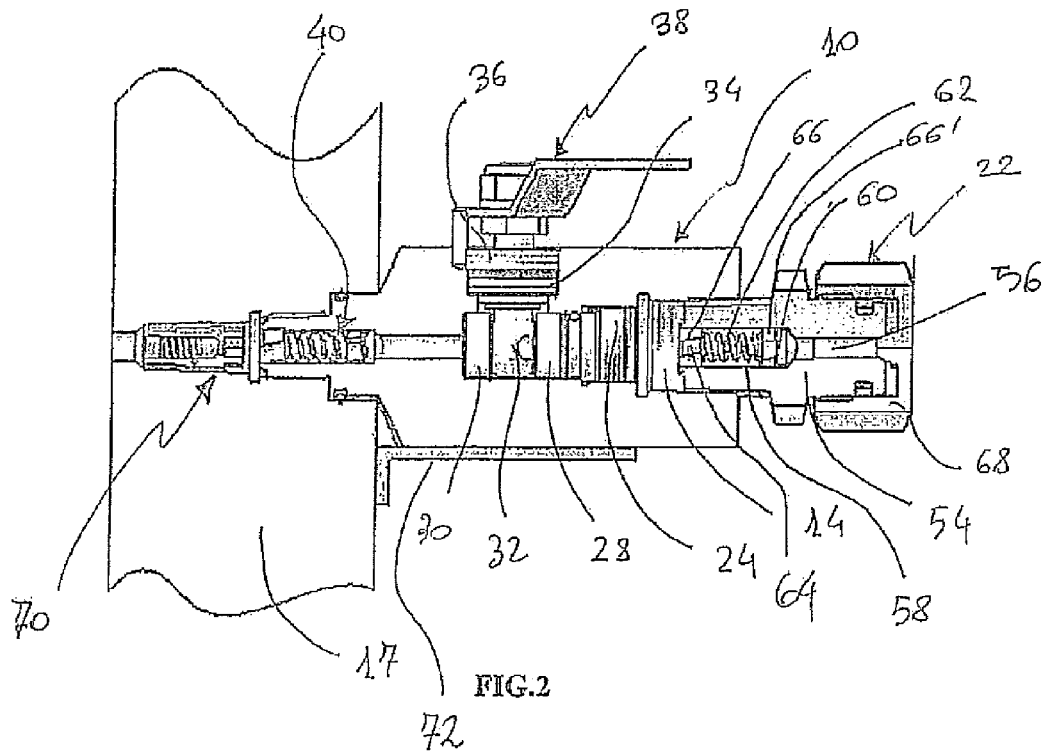
Figure 3:
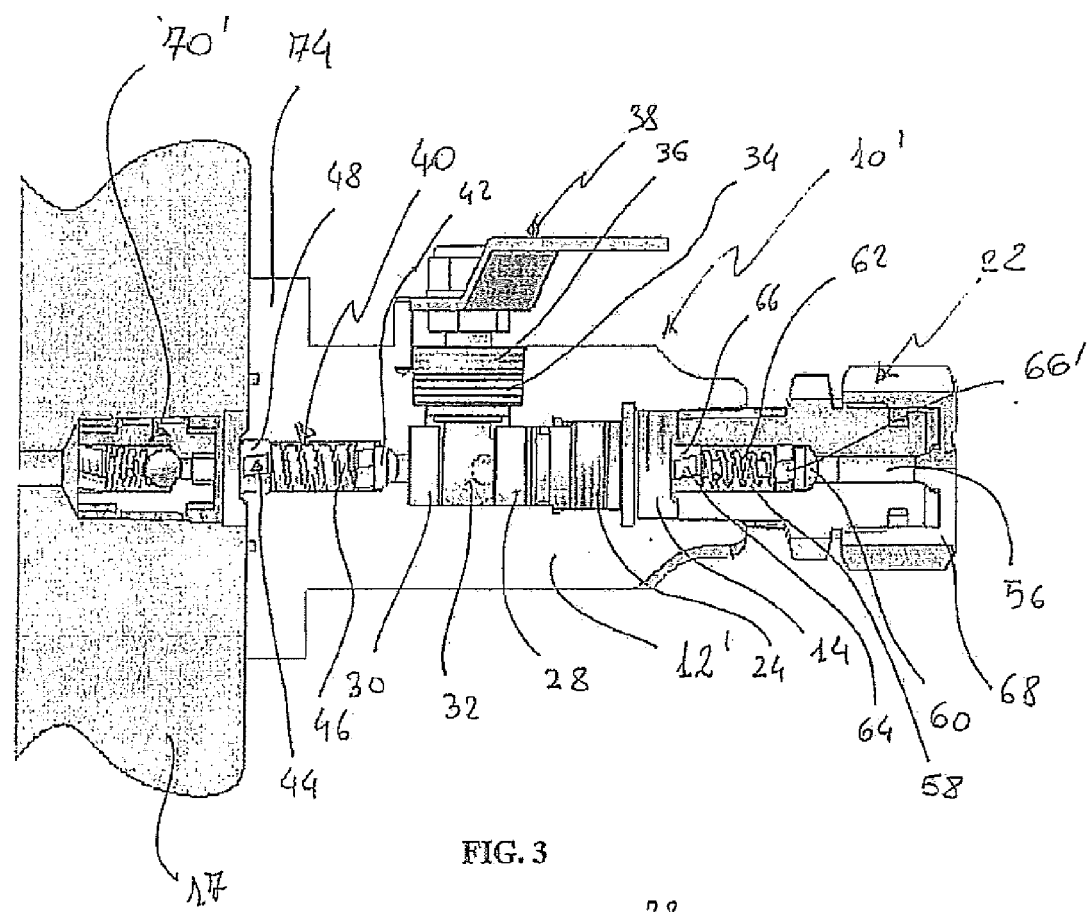

Greaser 22, as schematised in the preferred embodiment of FIGS. 2 and 3, is defined by a greasing body 54 provided with a channel 56 and with a further coaxial channel 58. A shutter 60 is arranged within said further channel 58, suitable for closing the passage of the lubricant fluid from channel 58, with said shutter 60 kept in closing position by a contrast spring 62 interposed between the same shutter and a dowel 64 closing an end of the greaser opposite shutter 60.

Dowel 64 and shutter 60 exhibit helical grooves 66 and 66' suitable for allowing the passage of the lubricant fluid.

A threaded cap 68 closes channel 56 of shutter 22 at the front, on the side opposite that of connection with valve 10.

With reference to FIG. 2, there is schematised the valve of the invention provided with shutter 22 and connected to tank 17. In such configuration, an optional control valve 70 of the traditional type is inserted in the shim of tank 17 for the axial seal.

A metal element 72, shaped as an "L" and stabilised to body 12 of valve 10 and to tank 17, defines an anti-rotation element for the same valve, to be used for threaded connection embodiments.

Figure 4:
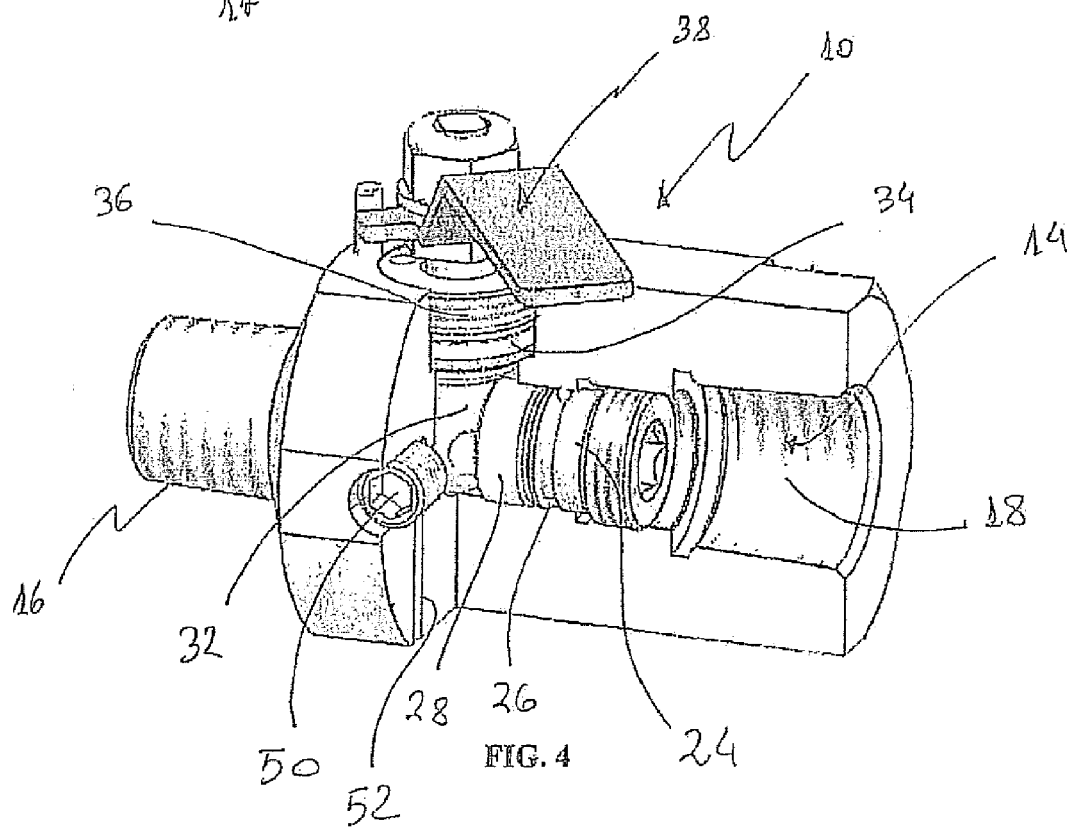
FIG. 4 shows a schematic axonometric cutaway view of the improved valve of the invention.

With reference to FIG. 3, there is schematised an alternative embodiment of the valve of the invention, indicated with reference numeral 10'; the details common to the solution of the preferred embodiment, described above in detail with reference to FIGS. 1, 2, 4 shall not be described any further.

According to such alternative embodiment, valve 10' comprises a body 12' which, at the end opposite that of connection with greaser 22, exhibits a flanged portion 74 for the connection and stabilisation, by means of screws or other retaining elements, of the same valve with tank 17 or other type of pressure device.

Also in the alternative embodiment schematised in FIG. 3, a further optional control valve 70' of the traditional type is positioned for the axial seal arranged in the shim of the tank coaxially to valve 10.

Figure 5:
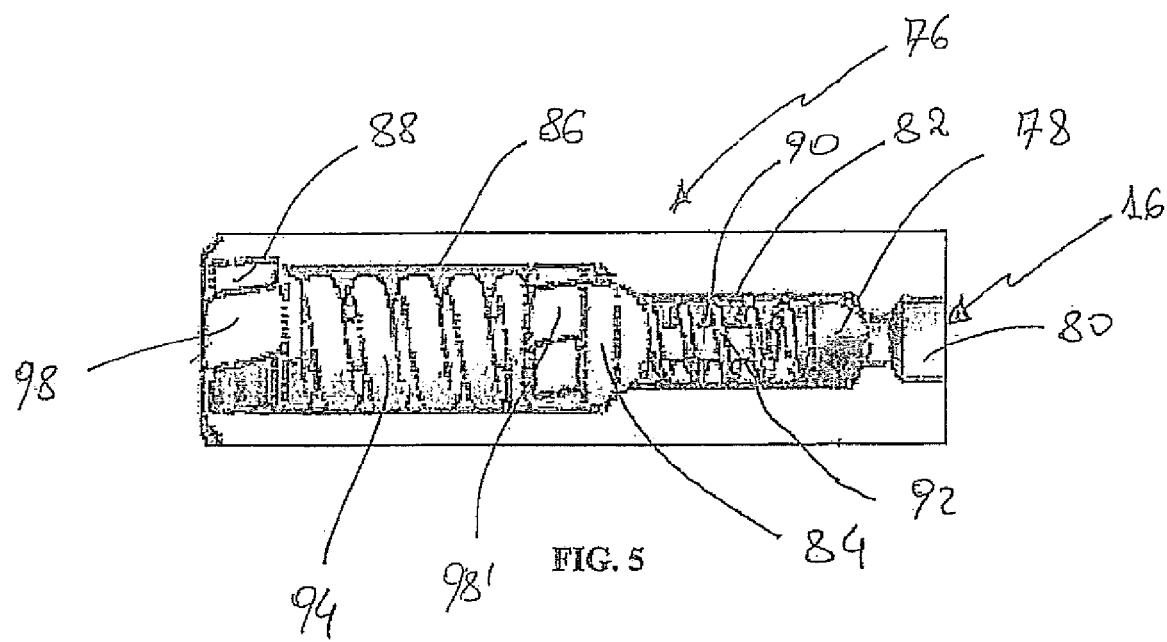
FIG. 5 shows a schematic and cutaway view of a detail of the improved valve of the invention according to an alternative embodiment.

In a further alternative embodiment, the optional control valve 70 and the further optional control valve 70' may be directly integrated in body 12, 12' of valve 10, 10'; moreover, said control valve may also be integrated in greaser 22, as schematised in the detail of FIG. 5.

In said condition, an integrated control valve 76 is arranged within the coaxial space 16 of body 12 and/or of greaser 22, herein described with reference to body 12 of valve 10 (the integrated valve optionally present in the greaser has similar technical-structural features and is therefore not described any further).

Said integrated valve 76 comprises a first shutter 78 closing the communication between a first portion 80 and a second portion 82 of the coaxial space 16, a second shutter 84 closing the communication between the second portion 82 and a third portion 86 of the coaxial space 16, a closing dowel 88 clamped to an end of the third portion 86 and opposite the second shutter 84.

On their side surface, the second shutter 84 and the closing dowel 88 exhibit helical grooves similar to those described above.

A stem 90 is formed on the surface of the second shutter 84 facing the direction of the first shutter 78, developed in the direction of said first shutter; a first contrast spring 92 is arranged between the first shutter 78 and the second shutter 84 with the function of keeping said first shutter closing the first portion 80 of the coaxial space 16.

A second contrast spring 94 is arranged in intermediate position between the second shutter 84 and the closing dowel 88, so as to keep said second shutter closing the second portion 82.

The configuration of the integrated valve described above defines a dual control valve and also ensures a dual safety against any leaks from the tank or to the greaser.

As can be noticed from the above, the advantages achieved by the improved valve of the invention described above with reference to the technical-structural features thereof are clear.

The improved grease valve for pressure devices of the present invention advantageously allows making the checks about the presence of pressure within a tank or other type of pressure device in a quick and easy manner since it already integrates all the control elements, defined by the control and/or dual control valves described above; said valve ensures a greaser safety for the users during operating maintenance works on the plant, checking the presence of potentially hazardous fluids or gases prior to the component removal.

A further advantage is represented by the fact that the axial sealing valve inserted in the tank is only optional, with the consequence that in the event of maintenance, it is not necessary to remove it anymore following a complex and as such, burdensome operation from the point of view of the time and related cost.

A further advantage is the fact that since the improved valve of the invention is provided with all the elements apt to carry out the checks, it exhibits very limited overall dimensions and a small weight.

A further advantage is the fact that the improved valve of the invention is simple and quick to install/remove.

A further advantage is the fact that the limited dimensions of the valve allow a limited use of the materials required for making the components of the same, ensuring a considerable saving for the user besides a great simplification in the study of the plant lay-out for the plant engineer in the assessment of the overall dimensions of the tanks and their accessories.

A further advantage is represented by the fact that since the improved valve of the invention integrates both the axial and the ball or pin seal check in a single element, it allows a considerable limitation of the overall dimensions and at the same time reduces the threaded connection points (cause of critical leaks) between the coupled components.

Although the invention has been described hereinbefore with particular reference to an embodiment thereof made by way of a non-limiting example only, several changes and variations will appear clearly to a man skilled in the art in the light of the above description. The present invention therefore includes all the changes and versions that fall within the spirit and scope of the following claims.

The invention claimed is:

1. An improved grease valve (10, 10') for cutting off the fluid or gas in a conduit (14) in a pressure device, client or container and allowing pressure control in such plant, tank or container in case of maintenance work prior to removing components, comprising:
   a body (12, 12') with profiled seat of said body (12, 12'), with a dowel (24), at least one seal or O-Ring (26), at least a first seat (28) and at least a second seat (30), a shutter (32) element interposed between said seats and, within a seat (35) made in a radial direction in said body (12, 12') and communicating with said conduit (14), a gland (34) and at least one seal (36) arranged coaxially, a lever actuator (38) and a connecting stem between said lever actuator (38) and said shutter (32) element;
   a lubrication device defined by a greaser (22), stabilised to a threaded seat (18) of the conduit (14) of the body (12, 12'), comprising a greasing body (54) provided with a channel (56) and a further channel (58) coaxial to each other, a shutter (60) arranged within said further channel (58), a dowel (64) closing an end of the greater opposite the shutter (60) and a contrast spring (62) interposed between the same shutter and the dowel (64), said greaser also comprises a threaded cap (68) fitted on the opposite end relative to that of connection of said greaser with the body (12, 12') of the grease valve (10,10');
   control device,
   an axial ball/pin sealing devices integrated and/or assembled to the body (12, 12') of said grease valve;
   the grease valve (10, 10') characterised in that said control device is defined by a control valve (40) comprising a sliding shutter (42), a stopping dowel (44) and an elastic element defined by a helical spring (46) arranged between said sliding shutter (42) and stopping dowel (44), with said control valve (40) arranged in a space (16) coaxial to the conduit (14) of the body (12, 12') of the valve (10, 10'), and said sliding shutter (42) and the stopping dowel (44) of the control valve (40) and the shutter (60) and the dowel (64) of the greaser (22) respectively exhibit, along the outside side surface, peripheral grooves (48, 48') and (66, 66') with helical pattern.

2. The grease valve according to claim 1, characterised in that it comprises a venting valve (50) arranged in radial direction within the body (12, 12') at the shutter (32) element and a discharge channel (52) is formed in the same body of the valve.

3. The grease valve according to claim 1, characterised in that it comprises, within the coaxial space (16) of the body (12, 12') and/or within the further channel (58) of the greaser (22), an integrated control valve (76) comprising a first shutter (78) closing the communication between a first portion (80) and a second portion (82) of the coaxial space (16) or of the further channel (58), a second shutter (84) closing the communication between the second portion (82) and a third portion (86) of the same coaxial space (16) or of the further channel (58), a closing dowel (88) clamped to an end of the third portion (86) and opposite the second shutter (84), with the second shutter (84) and the closing dowel (88) that on the side surface thereof exhibit helical grooves (98, 98'), a stem (90) developed in axial direction on the surface of the second shutter (84) facing the first shutter (78), a first contrast spring (92) arranged between the first shutter (78) and the second shutter (84), a second contrast spring (94) arranged in intermediate position between the second shutter (84) and the closing dowel (88).

4. The grease valve (10') according to claim 1, characterised in that the body (12'), has a first end connected with said greaser and and opposite in having a flanged portion (74) for connection and stabilisation with anti-rotation function relative to the tank (17).

5. An improved grease valve (10, 10') for cutting off the fluid or gas, in a conduit pressure devices (14), a body, with at least a first seat (28) and at least a second seat (30), a shutter (32) element interposed between said seats and a third seat (35) extending in a radial direction in said body (12, 12') and communicating with said conduit (14), a lever actuator (38) and a connecting stem between said lever actuator (38) and said shutter (32) element, a lubricating device, a control device, a grease valve characterized in that control device is defined by a control valve (40) comprising a sliding shutter (42), a stopping dowel (44) and an elastic element defined by a helical spring (46) arranged between said sliding shutter (42) and stopping dowel (44), with said control valve (40) arranged in a space (16) coaxial to the conduit (14) of the body (12, 12') of the valve (10, 10'); and an axial ball/pin sealing devices integrated and/or assembled to the body (12, 12') of said grease valve.

6. The grease valve according to claim 5 where said sliding shutter (42) and said stopping dowel (44) of the control valve (40) and the shutter (60) and the dowel (64) of the greater (22) respectively exhibit, along the outside side surface, peripheral grooves (48, 48') and (66, 66') with helical pattern.

7. The grease valve according to claim 5 characterized in that it comprises a venting valve (50) arranged in radial direction within the body (12, 12') at the shutter (32) element and a venting valve (50) arranged in radial direction within the body (12, 12') at the shutter (32) element.

* * * * *